(12) United States Patent
Miyazawa et al.

(10) Patent No.: US 7,853,143 B2
(45) Date of Patent: Dec. 14, 2010

(54) CAMERA

(75) Inventors: Takashi Miyazawa, Hachioji (JP); Shuhei Kaneko, Hino (JP); Takeshi Hiroshima, Hachioji (JP)

(73) Assignees: Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 418 days.

(21) Appl. No.: 11/975,382

(22) Filed: Oct. 18, 2007

(65) Prior Publication Data

US 2008/0095530 A1    Apr. 24, 2008

(30) Foreign Application Priority Data

Oct. 19, 2006    (JP)    ............... 2006-285441

(51) Int. Cl.
  *G03B 17/02*    (2006.01)
(52) U.S. Cl. ...................... 396/535; 396/540
(58) Field of Classification Search ................ 396/535, 396/540, 541; 348/373
  See application file for complete search history.

(56) References Cited

U.S. PATENT DOCUMENTS

| 5,237,362 | A | * | 8/1993 | Ishino et al. | .................. 396/79 |
| 6,069,745 | A | * | 5/2000 | Fujii et al. | ................. 359/694 |
| 6,850,279 | B1 | * | 2/2005 | Scherling | .................... 348/335 |
| 6,856,766 | B2 | * | 2/2005 | Suzuki | ........................ 396/535 |
| 7,333,148 | B2 | * | 2/2008 | Chang et al. | ................. 348/374 |
| 7,354,206 | B2 | * | 4/2008 | Kobayashi | ................... 396/448 |
| 2006/0098976 | A1 | * | 5/2006 | Takahashi et al. | ........... 396/535 |
| 2007/0077049 | A1 | | 4/2007 | Tsai | |

FOREIGN PATENT DOCUMENTS

| CN | 1940617 | 4/2007 |
| JP | 05-333254 | 12/1993 |
| JP | 2005-292514 | 10/2005 |

OTHER PUBLICATIONS

Second Notification of Office Action for Chinese Patent Application No. 200710149157.0, mailed Jul. 3, 2009 (4 pgs.) with translation (5 pgs.).

* cited by examiner

*Primary Examiner*—Rodney E Fuller
(74) *Attorney, Agent, or Firm*—Straub & Pokotylo; John C. Pokotylo

(57) ABSTRACT

A camera has an outer case member and a lens barrel unit having a movable lens movable along a straight line. The relation between the shape of the outer case member and the layout of the lens barrel unit is such that when the camera falls in the same direction as the straight line to contact with a flat surface for the first time, the camera contacts the flat surface at a portion other than directly below the center of gravity. Examples of the camera disclosed include a camera having the lens barrel unit disposed tilted in the outer case member, a camera whose outer case member has a wedge-like shape, and a camera having a projection formed at the outer case member.

12 Claims, 11 Drawing Sheets

CAMERA

CROSS REFERENCES TO RELATED APPLICATION

This application is based upon and claims the benefit of priority from prior Japanese Patent Application No. 2006-285441, filed on Oct. 19, 2006, the entire contents of which are incorporated herein by reference.

BACKGROUND OF THE INVENTION

1. Field of the Invention

The present invention relates to a camera, and, more particularly, to a camera with a lens barrel unit provided in an outer case member, having a lens barrel unit layout and the structure of an outer case member, both of which are designed in consideration of reduction in shock loading and high impact resistance.

2. Description of the Related Art

It is desired that cameras or the like should be compact so that a user can easily carry a camera around, and take out and use it whenever desirable.

Accordingly, conventional cameras have a lens barrel unit whose casing is made flatter by using a bending optical system. Available bending optical systems include, for example, a system configured so as to bend the optical axis of a light beam input to an optical member from a front face side by using a reflector or the like to guide the light beam to the light receiving face of an image pickup device disposed at the bottom face or the like in the casing.

The conventional cameras with compact and flat casings realized with various measures taken, such as use of the bending optical system as a shooting optical system, have been made practical and become popular.

A user can easily carry around such a conventional camera with a compact and flat casing realized with the various measures taken, and use it whenever desirable. While the user is carrying around or using the camera, for example, the user is likely to drop the camera unintentionally or cause the camera to bump on some structure.

When external force originating from an unintentional shock or the like is applied to the casing of a camera while the camera is being carried around or is in use, an unnecessary load is applied to internal components of the camera, such as the lens barrel unit, as well as the outer case member which forms the casing of the camera.

In the casing of an ordinary camera, a plurality of optical lenses or the like are held in such a way that their optical axes coincide with one another. Further, components having movable parts, such as the lens barrel unit capable of moving some of the optical lenses in directions along the optical axes, are disposed in the casing.

In such a camera, for example, when external force in the direction in which the lens hold frame of the lens barrel unit moves, i.e., the same direction as the direction along the optical axis of an optical lens, is applied to the casing of the camera, the lens hold frame and the optical lens may be damaged.

FIG. 11 is a diagram of essential components (lens hold frames, etc.) of the lens barrel unit of a conventional camera extracted therefrom and viewed from the back face.

A lens barrel unit 121 shown in FIG. 11 has a bending optical system which bends an optical axis O1 of a light beam, input from the front face side, by means of a reflector 130a secured to a first lens hold frame 130 to guide the input light beam in a direction along an optical axis O2, i.e., toward the bottom face.

The essential portions of the lens barrel unit 121 include the first lens hold frame 130, a second lens hold frame 124, a third lens hold frame 125, a fourth lens hold frame 126, a slide shaft 122a and a slide shaft 122b.

The first lens hold frame 130 holds a first group of lenses (not shown) disposed to face frontward, and the reflector 130a. The second lens hold frame 124 holds a second group of lenses 124a that is a movable lens group movable in a direction of an arrow M shown in FIG. 11 along the slide shafts 122a, 122b. The third lens hold frame 125 holds a third group of lenses 125a movable in the same direction M. The fourth lens hold frame 126 holds a fourth group of lenses 126a. The slide shaft 122a holds one ends of the first to fourth lens hold frames 130, 124, 125, 126 in such a way that the optical axes of the individual lens groups coincide with one another, and guides the movements of the second and third lens hold frames 124, 125. The slide shaft 122b holds the other ends of the third and fourth lens hold frames 125, 126, and guides the movement of the third lens hold frame 125.

Generally, the lens barrel unit 121 is arranged inside the camera in such a way that the optical axis O2 coincides with the vertical direction (direction of an arrow X in FIG. 11).

When the camera having the thus configured lens barrel unit 121 disposed inside the casing falls in, for example, the vertical direction (X direction), impact force is generated on, for example, the second lens hold frame 124 in a direction indicated by an arrow F0 in FIG. 11 (same direction as the vertical direction X).

When the fall-oriented impact force is applied to the individual components of the lens barrel unit 121, the lens hold frames, the lens groups, etc. may be damaged. Of those damageable components, particularly, the second lens hold frame 124 of the second group of lenses 124a which are movable lenses are cantilevered so as to be movably held only by the slide shaft 122a. Accordingly, bending moment in a direction of an arrow R in FIG. 11 (counterclockwise direction in FIG. 11) acts on the second lens hold frame 124 at the same instant as the camera falls.

In this respect, there have been various proposals made on a technique of relaxing, suppressing or absorbing the impact force to be applied to the internal components of a camera, particularly, the lens barrel unit, as much as possible when the camera falls or collides with something.

For example, a camera disclosed in Japanese Patent Application Laid-Open No. 2005-292514 has an urging member like a coil spring fitted over the slide shaft of the lens hold frame of a lens barrel unit. This configuration relaxes the shocks caused by the external force in the slide direction of the lens hold frame along the optical axis of an optical lens, and increases the contact area with which the lens hold frame contacts, thereby relaxing the intensive stress on the contact portion.

Another camera disclosed in, for example, Japanese Patent Application Laid-Open No. H5-333254 has a lens barrel unit whose lens frame is provided with a spring member which applies an urging force vertical to the optical axis, the guide shaft and the drive shaft, and with which the drive shaft is pressed engaged.

BRIEF SUMMARY OF THE INVENTION

A camera of this invention has an outer case member and a lens barrel unit having a movable lens movable along a line. The shape of the outer case member and the layout of the lens barrel unit has a relationship such that when the camera falls in the same direction as the line to contact with a flat surface for the first time, the camera contacts the flat surface at a portion other than what is located directly below the center of gravity.

As an exemplary structure of the present invention, a camera comprises an outer case member having one face or a plurality of faces including normal lines passing through a center of gravity of the camera; and a lens unit disposed inside the outer case member and having a lens movable in a direction to which none of the normal lines passing through the center of gravity are in parallel.

As another exemplary structure of the present invention, a camera comprising an outer case member including a first outer case surface having a normal line passing through a center of gravity of the camera, and a second outer case surface having no normal line passing through the center of gravity; and a lens barrel unit having a lens frame which moves a lens, and disposed inside the outer case member in such a way that a moving direction of the lens frame is not in parallel to the normal line passing through the center of gravity.

As a further exemplary structure of the present invention, a camera comprising an outer case member including a face having a normal line passing through a center of gravity of the camera; a projection formed at the face having the normal line passing through the center of gravity at a position off extension of the normal line passing through the center of gravity, and protruding outward; and a lens barrel unit having a lens movable in a direction in parallel to the normal line passing through the center of gravity.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 5 is a conceptual diagram chronologically illustrating an operation with the bottom face of the camera in FIG. 1 hitting a planar floor or the like in a state approximately in parallel to a camera-dropped surface when the camera falls on the floor or the like;

FIG. 6 is a conceptual diagram chronologically illustrating an operation with the bottom face of the camera in FIG. 1 hitting a planar floor or the like in a state where the optical axis of the lens barrel unit of the camera is approximately orthogonal to a camera-dropped surface when the camera falls on the floor or the like;

FIG. 8 is a conceptual diagram chronologically illustrating an operation with the bottom face of the camera in FIG. 7 hitting a planar floor or the like in a state where the optical axis of the lens barrel unit of the camera is approximately orthogonal to a camera-dropped surface when the camera falls on the floor or the like;

FIG. 10 is a conceptual diagram chronologically illustrating an operation with the bottom face of the camera in FIG. 9 hitting a planar floor or the like in a state where the optical axis of the lens barrel unit of the camera is approximately orthogonal to a camera-dropped surface when the camera falls on the floor or the like.

DETAILED DESCRIPTION OF THE PREFERRED EMBODIMENTS

Preferred embodiments of the invention are described below with reference to the accompanying drawings.

Figure 1:
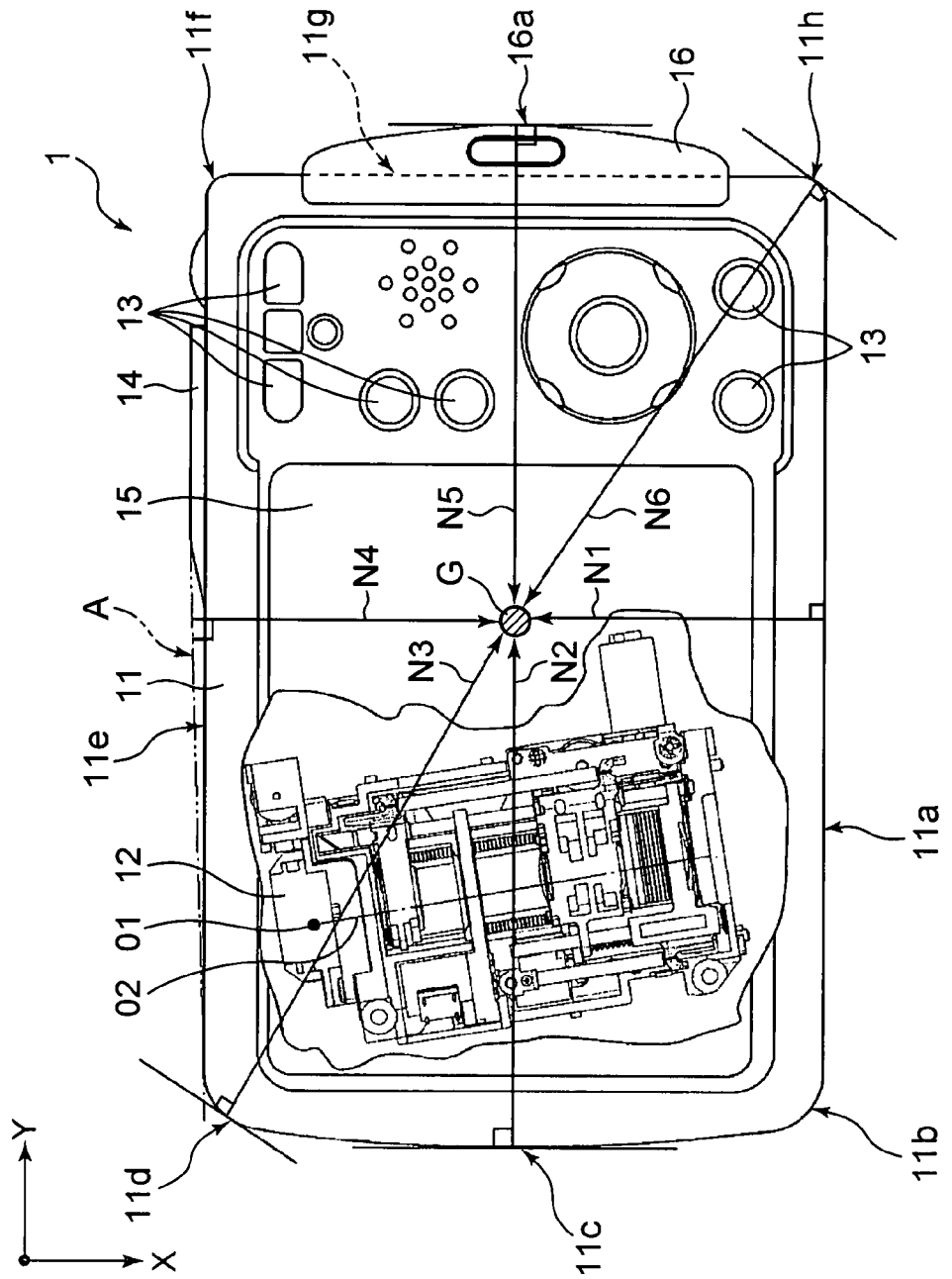
FIG. 1 is a rear view of a camera according to a first embodiment of the present invention.
Figure 2:
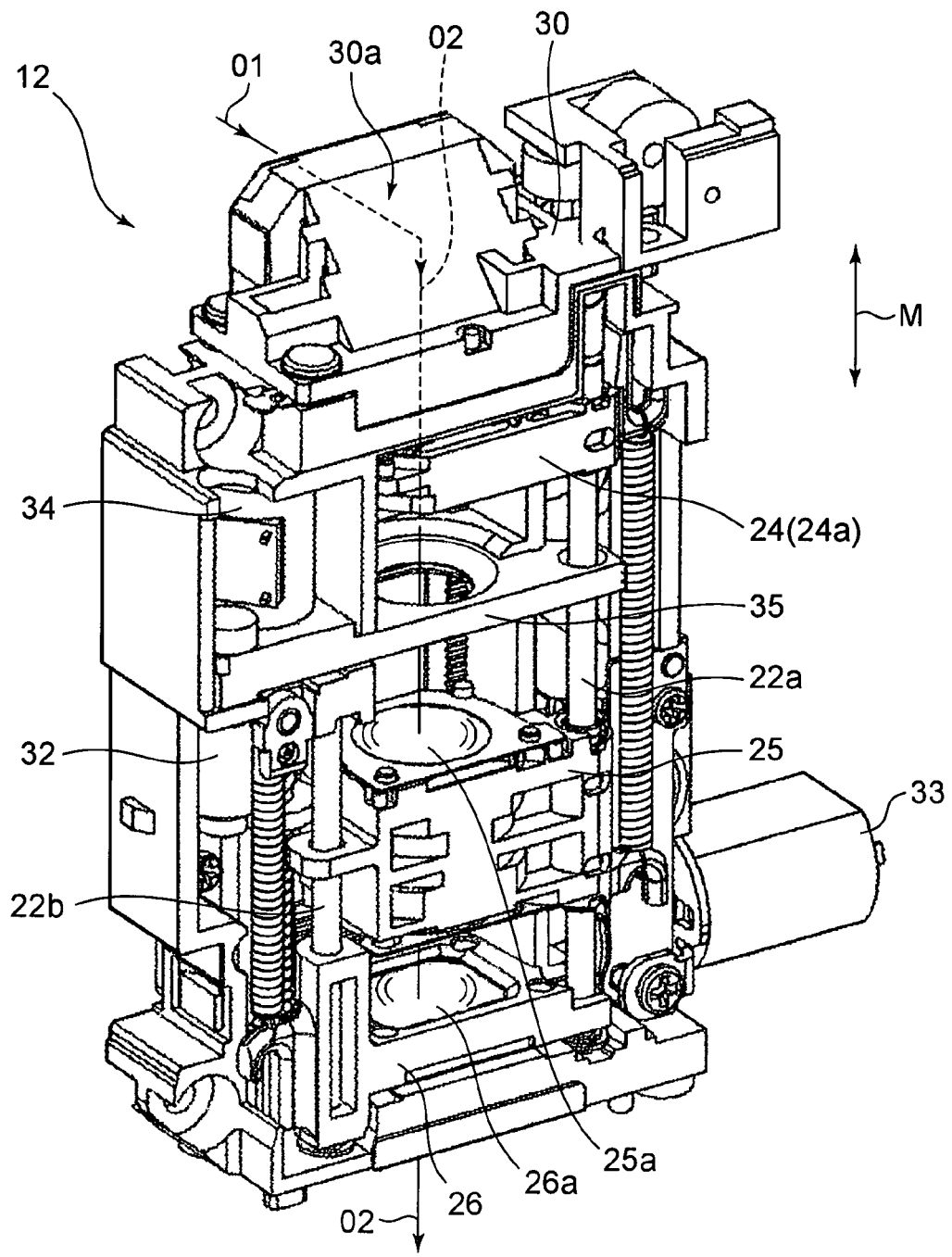
FIG. 2 is an external perspective view of a lens barrel unit provided in the camera in FIG. 1 extracted therefrom and viewed from the back face.
Figure 3:
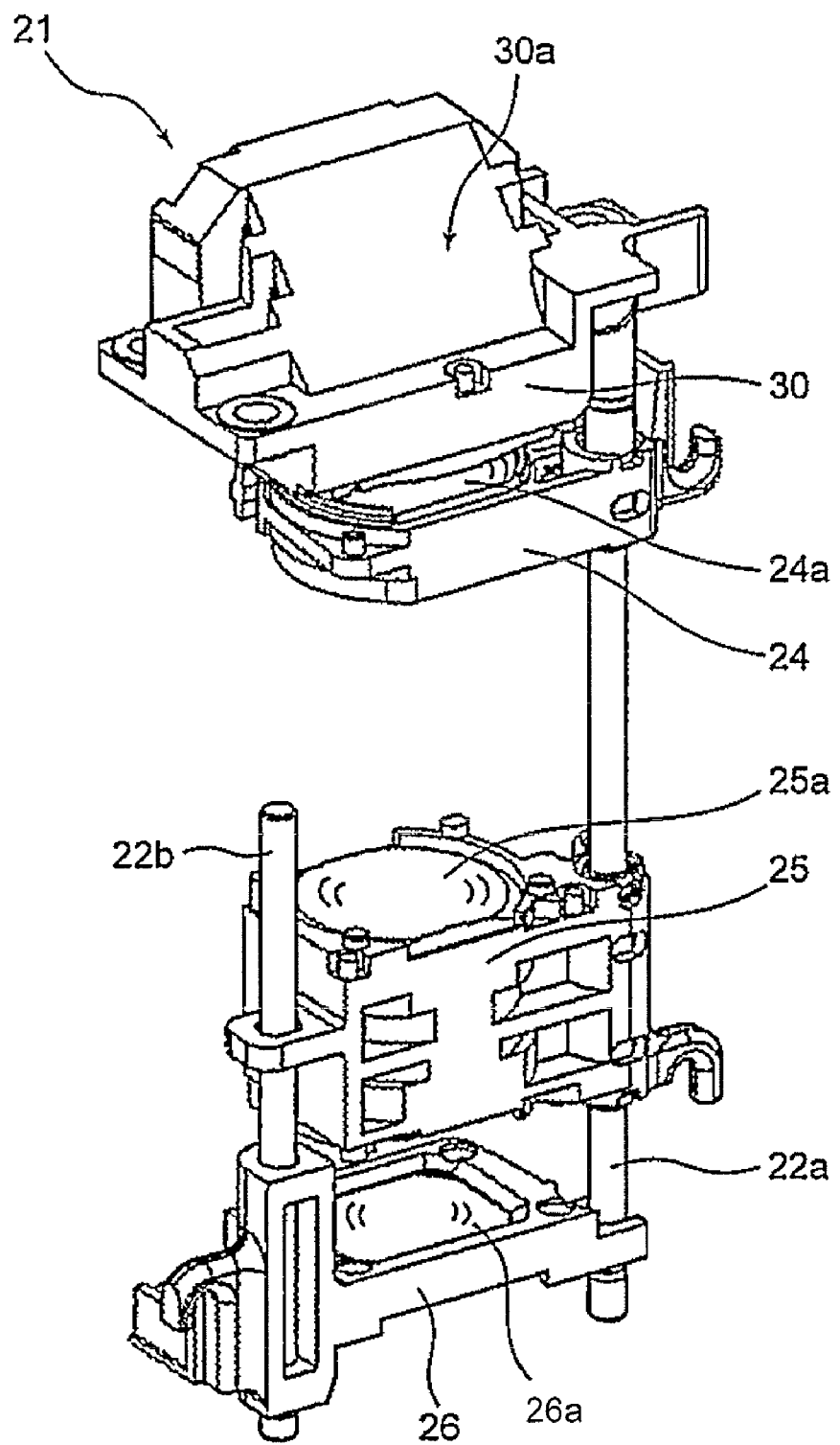
FIG. 3 is an external perspective view of a lens frame unit in the lens barrel unit in FIG. 2 extracted therefrom and viewed from the back face.
Figure 4:
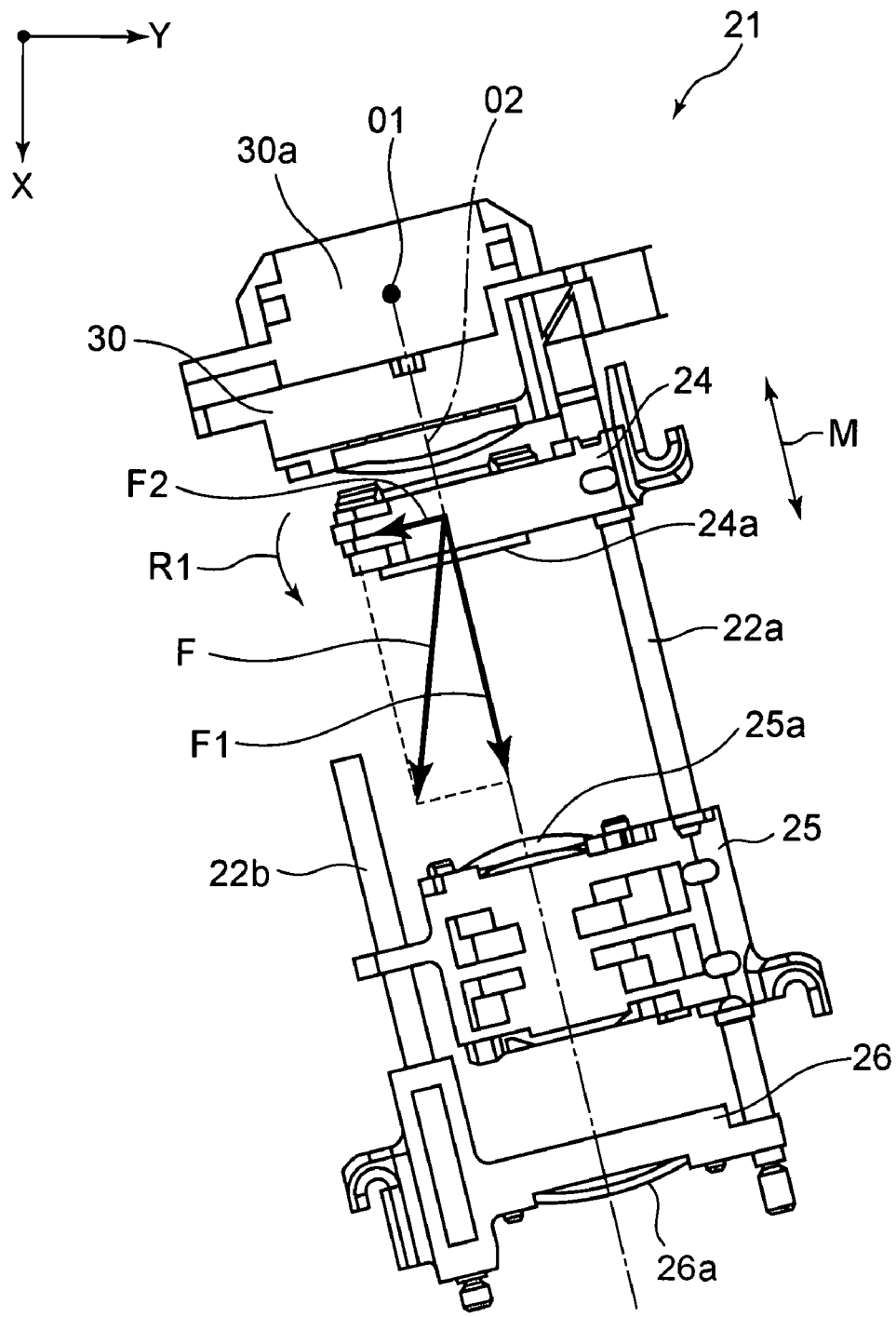
FIG. 4 is a rear view of essential components (lens hold frames, etc.) of the lens barrel unit of the camera in FIG. 1 extracted therefrom.

FIG. 1 is a rear view of a camera 1 according to the first embodiment of the present invention from the back face side. With partly broken away, FIG. 1 shows the layout state of a lens barrel unit 12 provided inside the camera 1 in FIG. 1. FIG. 2 is an external perspective view of a lens barrel unit 12 provided in the camera 1 in FIG. 1 extracted therefrom and viewed from the back face. FIG. 3 is an external perspective view of a lens frame unit in the lens barrel unit 12 in FIG. 2 extracted therefrom and viewed from the back face. The lens frame unit includes a plurality of lenses, lens hold frames thereof, and slide shafts which hold the lens hold frames. FIG. 4 is a rear view of essential components (lens hold frames, etc.) of the lens barrel unit 12 of the camera 1 in FIG. 1 extracted therefrom.

As shown in FIG. 1, the camera 1 of the embodiment has an outer case member 11 and a lens barrel unit 12. The outer case member 11 forms a casing having an approximately parallelepiped box shape. The lens barrel unit 12 is arranged at a predetermined position in the outer case member 11. Various kinds of materials, such as brass that is copper alloy, aluminum alloy, zinc die-cast, and a synthetic resin, such as polycarbonate resin, can be used for the outer case member 11.

The back face of the outer case member 11 is provided with a plurality of operating members 13 for various kinds of operations, and the display part of a display device 15. A shutter button 14 is disposed at the top face of the outer case member 11. A strap fitting 16 is disposed at one side face of the outer case member 11.

The outer case member 11 is formed by a near hexahedron having a bottom face 11a, a left side face 11c, a top face 11e, a right side face 11g, a rear face and a front face.

In the following description, the right and left are defined on the premise of the state of the camera 1 viewed from the back face thereof (state shown in FIG. 1). Therefore, a side face shown on the left side in FIG. 1 is called "left side face 11c", and a side face shown on the right side in FIG. 1 is called "right side face 11g".

The individual faces forming the outer case member 11 have a relationship such that the bottom face 11a and the left side face 11c are contiguous via a corner portion 11b, the left side face 11c and the top face 11e are contiguous via a corner portion 11d, the top face 11e and the right side face 11g are contiguous via a corner portion 11d corner portion 11f, and the right side face 11g and the bottom face 11a are contiguous via a corner portion 11h.

The lens barrel unit 12 is disposed inside the outer case member 11 at a predetermined position in a predetermined manner. The details of the layout state of the lens barrel unit 12 with respect to the outer case member 11 will be given later.

The center of gravity of the camera 1 is assumed to be at a position indicated by a reference numeral G in FIG. 1. In this case, the outer case member 11 is formed so as to have faces having normal lines passing through the center of gravity G.

Specifically, in FIG. 1, for example, a normal line N1 of the bottom face 11a of the outer case member 11 passes through the center of gravity G. A normal line N2 of the left side face 11c of the outer case member 11 passes through the center of gravity G. A normal line N3 of the corner portion 11*d* passes through the center of gravity G. A normal line N4 of a face A connecting one end of the top face 11*e* of the outer case member 11 to the top face of the shutter button 14 passes through the center of gravity G. A normal line N5 of an outer peripheral face 16*a* of the strap fitting 16 protruding from the right side face 11*g* passes through the center of gravity G. A normal line N6 of the corner portion 11*h* passes through the center of gravity G.

Provided that the front face and back face of the camera 1 are planes, those faces have normal lines passing through the center of gravity; however, none of the normal lines are in parallel to an optical axis O2 of the lens barrel unit 12 to be described later.

The face A that connects one end of the top face 11*e* of the outer case member 11 to the top face of the shutter button 14 is an imaginary plane which contacts a flat surface when the camera 1 is placed with its top face being in contact with that flat surface. The portions of the camera 1 which actually contact the flat surface in this case are two portions, namely, one end of the top face 11*e* (near the corner portion 11*d*) and the top face of the shutter button 14.

As apparent from the above, the outer case member 11 of the embodiment includes faces whose normal lines pass through the center of gravity G of the camera 1.

As shown in FIG. 2, the lens barrel unit 12 has a bending optical system which bends an optical axis O1 of a light beam, input from the front face side, by means of a reflector 30*a* secured to a first lens hold frame 30 to guide the input light beam in a direction along an optical axis O2, i.e., toward the bottom face.

The essential portions of the lens barrel unit 12 include a lens frame unit 21 (see FIG. 3), a shutter frame 35, a shutter drive motor 34 secured to the shutter frame 35, a focusing motor 32, and a zooming motor 33. The shutter frame 35 is secured between a second lens hold frame 24 and a third lens hold frame 25 of the lens frame unit 21.

The lens frame unit 21 has a plurality of lenses, lens hold frames thereof, and slide shafts which hold the lens hold frames. Specifically, the lens frame unit 21 has the first lens hold frame 30, the second lens hold frame 24, the third lens hold frame 25, a fourth lens hold frame 26, a slide shaft 22*a*, and a slide shaft 22*b*.

The first lens hold frame 30 holds a first group of lenses (not shown) disposed to face frontward, and the reflector 30*a*. The second lens hold frame 24 is cantilevered with the slide shaft 22*a* as a fulcrum, and holds a second group of lenses 24*a* that is a movable lens group movable in a direction of an arrow M shown in FIG. 2 along the slide shaft 22*a*. The third lens hold frame 25 is cantilevered with the slide shaft 22*a* as a fulcrum, and holds a third group of lenses 25*a* movable in the same direction M. The fourth lens hold frame 26 holds a fourth group of lenses 26*a*. The slide shaft 22*a* holds one ends of the first to fourth lens hold frames 30, 24, 25, 26 in such a way that the optical axes of the individual lens groups coincide with one another, and guides the movements of the second and third lens hold frames 24, 25. The slide shaft 22*b* holds the other ends of the third and fourth lens hold frames 25, 26, and guides the movements of the third and fourth lens hold frames 25, 26.

The thus configured lens barrel unit 12 is securely provided in the camera 1 in a layout state shown in FIG. 1.

That is, the lens barrel unit 12 is arranged inside the camera 1 in such a way that none of normal lines (Nx) on each face of the outer case member 11 which pass through the center of gravity of the camera 1 are in parallel to the moving direction of the movable lenses (second lens group 24*a*, third lens group 25*a*) of the lens barrel unit 12 (direction along the optical axis O2).

Figure 5:
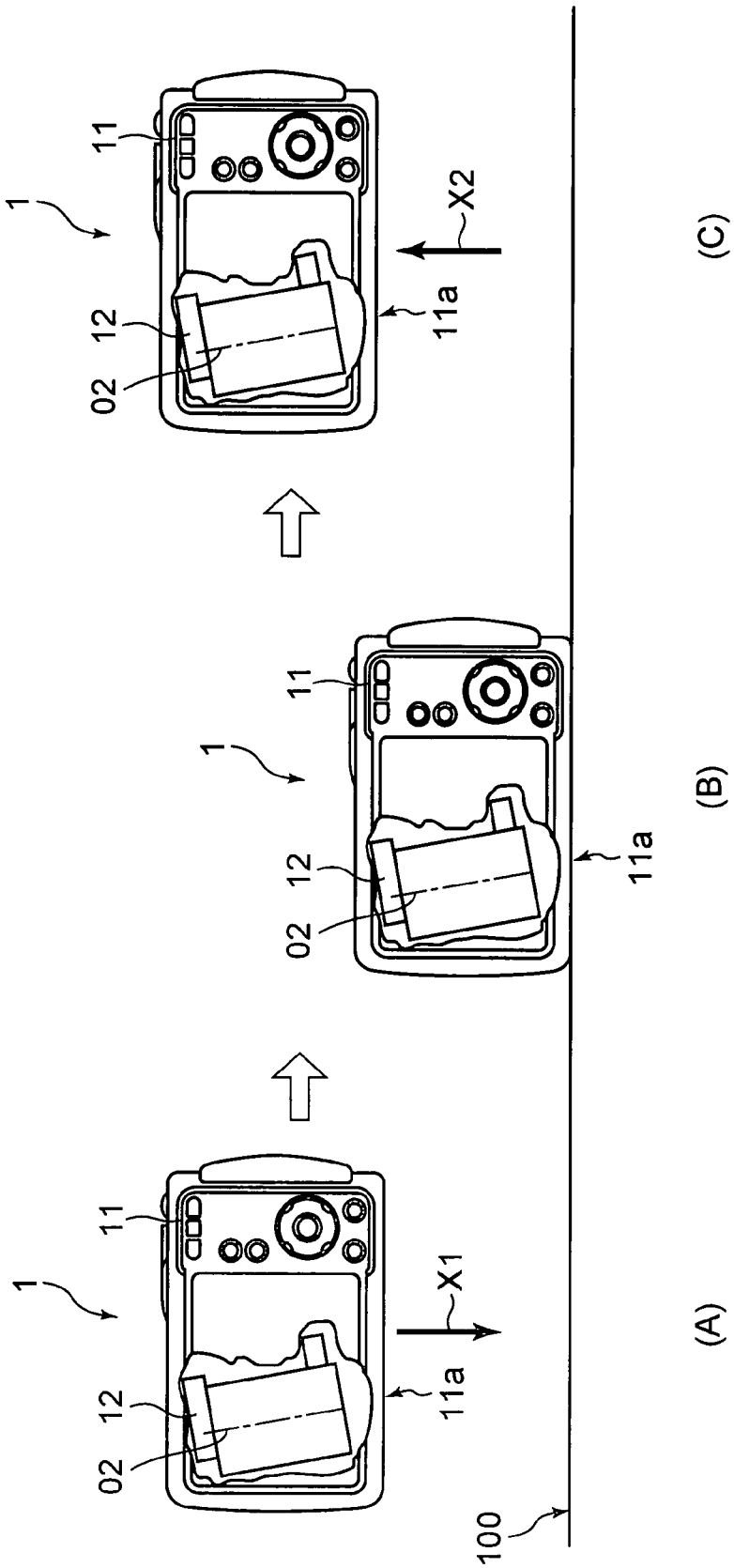

When the camera 1 of the embodiment having the above-described configuration falls in the vertical direction (direction of an arrow X1) with the bottom face 11*a* of the outer case member 11 down as shown in (A) in FIG. 5, for example, force indicated by an arrow F in FIG. 4 is generated at the second lens hold frame 24 and the camera 1 collides against a floor or the like. At the time of collision, fall impact force indicated by the arrow F is separated into forces in two directions of an arrow F1 and an arrow F2 in FIG. 4. At the same time, bending moment in a direction of an arrow R1 in FIG. 4 (counterclockwise direction in FIG. 4) acts on the second lens hold frame 24.

In the camera 1 of the embodiment, as apparent from the above, the impact force F1 applied to the second lens hold frame 24 in the lens barrel unit 12 becomes smaller than the impact force F in the vertical direction (X direction) (F>F1).

In other words, when the camera 1 falls, the force applied to (the movable lenses of) the lens barrel unit 12 becomes the maximum force F when the falling direction (direction along the arrow X in FIG. 4) coincides with the moving direction of the movable lenses (optical axis O2). In the embodiment, the lens barrel unit 12 is arranged in such a way that the optical axis O2 is not in parallel to the falling-direction of the camera 1 (X direction) to reduce the impact force to be applied to the lens barrel unit 12.

An example of the operation at the time the camera 1 of the embodiment falls will be described referring to FIGS. 5 and 6.

FIG. 5 is a conceptual diagram chronologically illustrating the operation with the bottom face of the camera of the embodiment hitting a planar floor or the like in a state approximately in parallel to a camera-dropped surface when the camera falls on the floor or the like.

First, let us consider a case where the camera 1 of the embodiment falls toward a planar floor, or flat surface (hereinafter called "camera-dropped surface") 100 in a direction of the arrow X1 in FIG. 5(A), with the bottom face 11*a* of the camera 1 being approximately in parallel to the camera-dropped surface 100. In this case, the optical axis O2 of the lens barrel unit 12 of the camera 1 is neither in parallel to the falling direction X1 or the normal line N1 (see FIG. 1) passing through the center of gravity of the bottom face 11*a*.

When the bottom face 11*a* of the camera 1 hits the camera-dropped surface 100 while keeping the state as shown in FIG. 5(B), the impact force applied to the second lens hold frame 24 of the lens barrel unit 12 becomes the force indicated by a reference numeral "F1" in FIG. 4 as has been described above referring to FIG. 4.

After hitting the camera-dropped surface 100, the camera 1 bounces in a direction of an arrow X2 as shown in FIG. 5(C). The bouncing direction (direction of the arrow X2) is along the falling direction X1 in the opposite direction thereto.

Figure 11:
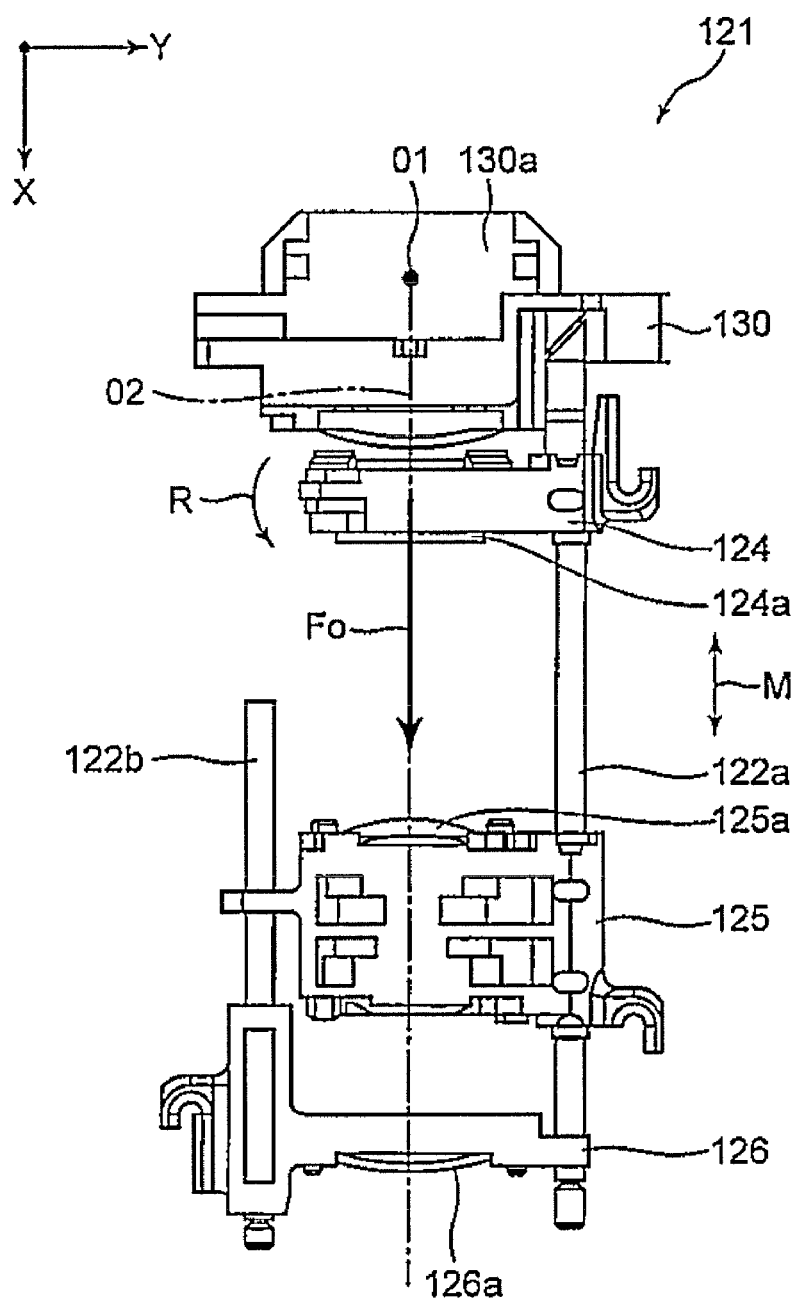
FIG. 11 is a rear view of essential components (lens hold frames, etc.) of the lens barrel unit of the conventional camera extracted therefrom.

In a case where the camera 1 falls in the state as shown in FIG. 5, therefore, when the impact force caused by the fall (see FIG. 4) is applied to the second lens hold frame 24, the impact force in the direction of the optical axis O2 becomes the component force F1 (see FIG. 4) smaller than F. As seen in the direction of the optical axis O2, therefore, the impact force applied to the lens barrel unit 12 of the embodiment becomes smaller than that when the falling direction X and the optical axis O2 in the conventional camera (see FIG. 11) coincide with each other.

Figure 6:
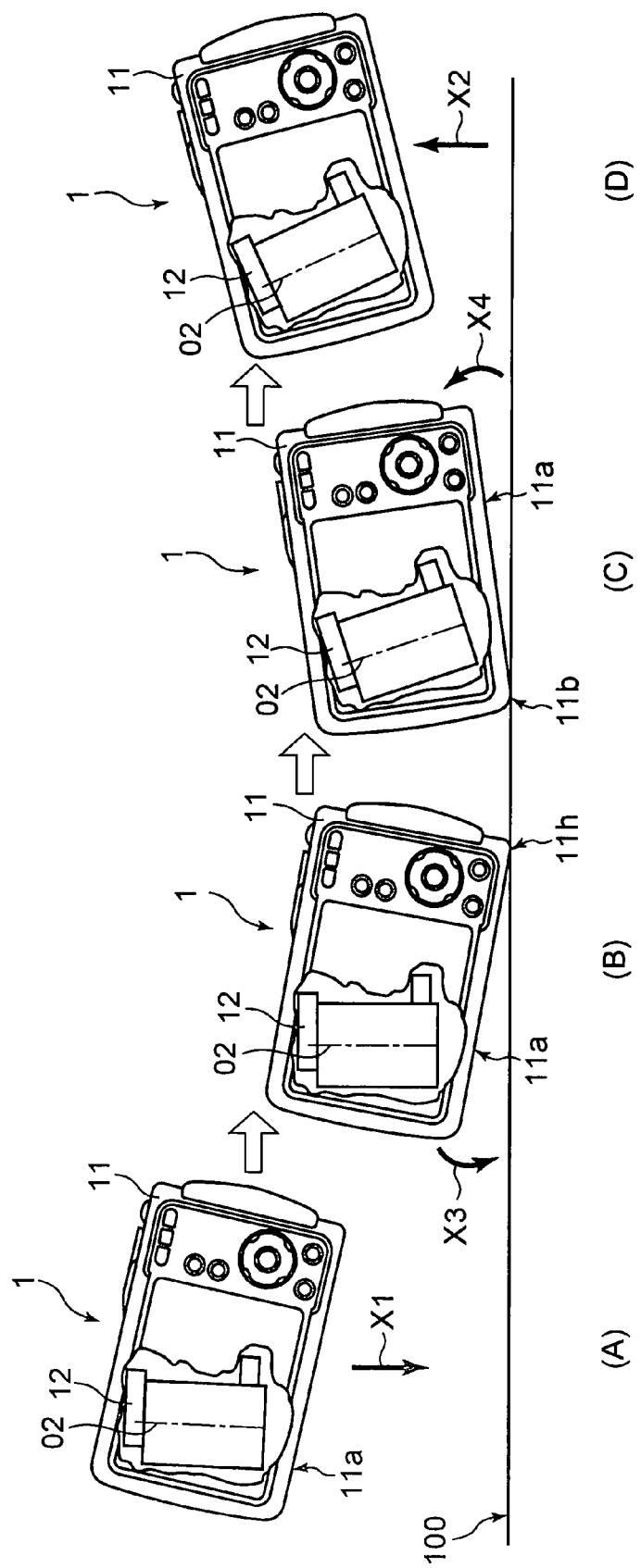

FIG. 6 is a conceptual diagram chronologically illustrating the operation with the bottom face of the camera of the embodiment hitting a planar floor (or flat surface) or the like in a state where the optical axis O2 of the lens barrel unit of the camera is approximately orthogonal to a camera-dropped surface when the camera falls on the floor or the like.

The example shown in FIG. 6 is a case where the camera 1 falls toward the camera-dropped surface 100 in the direction of an arrow X1 in FIG. 6(A) with the bottom face 11a of the camera 1 being not in parallel to the camera-dropped surface 100.

In this case, the optical axis O2 of the lens barrel unit 12 of the camera 1 is approximately in parallel to, for example, the falling direction X1 and the bottom face 11a and the camera-dropped surface 100 are not in parallel to each other.

With the state maintained, first of all, the corner portion 11h of the camera 1 hits the camera-dropped surface 100.

Next, the camera 1 rotates in a direction of an arrow X3 shown in FIG. 6(B) (counterclockwise direction in FIG. 6(B)) about the corner portion 11h which is the contact point, and changes its state in such a direction that the bottom face 11a contacts the camera-dropped surface 100. That is, the impact force generated when the camera 1 falls and hits the camera-dropped surface 100 is converted to the torque in the direction of the arrow X3.

When the corner portion 11b of the camera 1 contacts the camera-dropped surface 100, the torque of the camera 1 in the direction of the arrow X3 causes the camera 1 to rotate in the direction of the arrow X4 (counterclockwise direction in FIG. 6(C)) about the corner portion 11b as shown in FIG. 6(C). Accordingly, the camera 1 changes to a state as shown in FIG. 6(C)).

Then, the camera 1 receives the bouncing force in the direction of the arrow X2 shown in FIG. 6(D) while receiving the torque in the direction of the arrow X4.

In a case where the camera 1 falls in the state as shown in FIG. 6, therefore, the fall-oriented impact force is converted to the torque to rotate the camera 1 and attenuated when the camera 1 hits the camera-dropped surface 100. This also reduces the impact force to be applied to the lens barrel unit 12.

According to the first embodiment of the invention, as described above, the lens barrel unit 12 is arranged inside the camera 1 in such a way that none of normal lines (Nx) on each face of the outer case member 11 which pass through the center of gravity of the camera 1 are in parallel to the moving direction of the movable lenses (second lens group 24a, third lens group 25a) of the lens barrel unit 12 (optical axis O2). That is, the potential energy the camera 1 has immediately before falling is transformed to the rotational energy after falling, and is gradually consumed to reduce the load applied to the lens barrel unit 12 by the impact force caused by the impact or the like generated when the camera 1 falls.

The moving direction of the movable lenses of the lens barrel unit 12 is inclined to any of the bottom face 11a, the left side face 11c, the top face 11e and the right side face 11g of the outer case member 11. This separates the impact force in the moving direction and relaxes the force even when the camera 1 falls with those faces being horizontal as shown in FIG. 5.

Because the configuration of the embodiment eliminates the need for additional components, the impact resistance of the lens barrel unit 12 can be ensured by merely properly designing the arrangement of the lens barrel unit 12 in the outer case member 11.

Next, the second embodiment of the invention will be described below.

Figure 7:
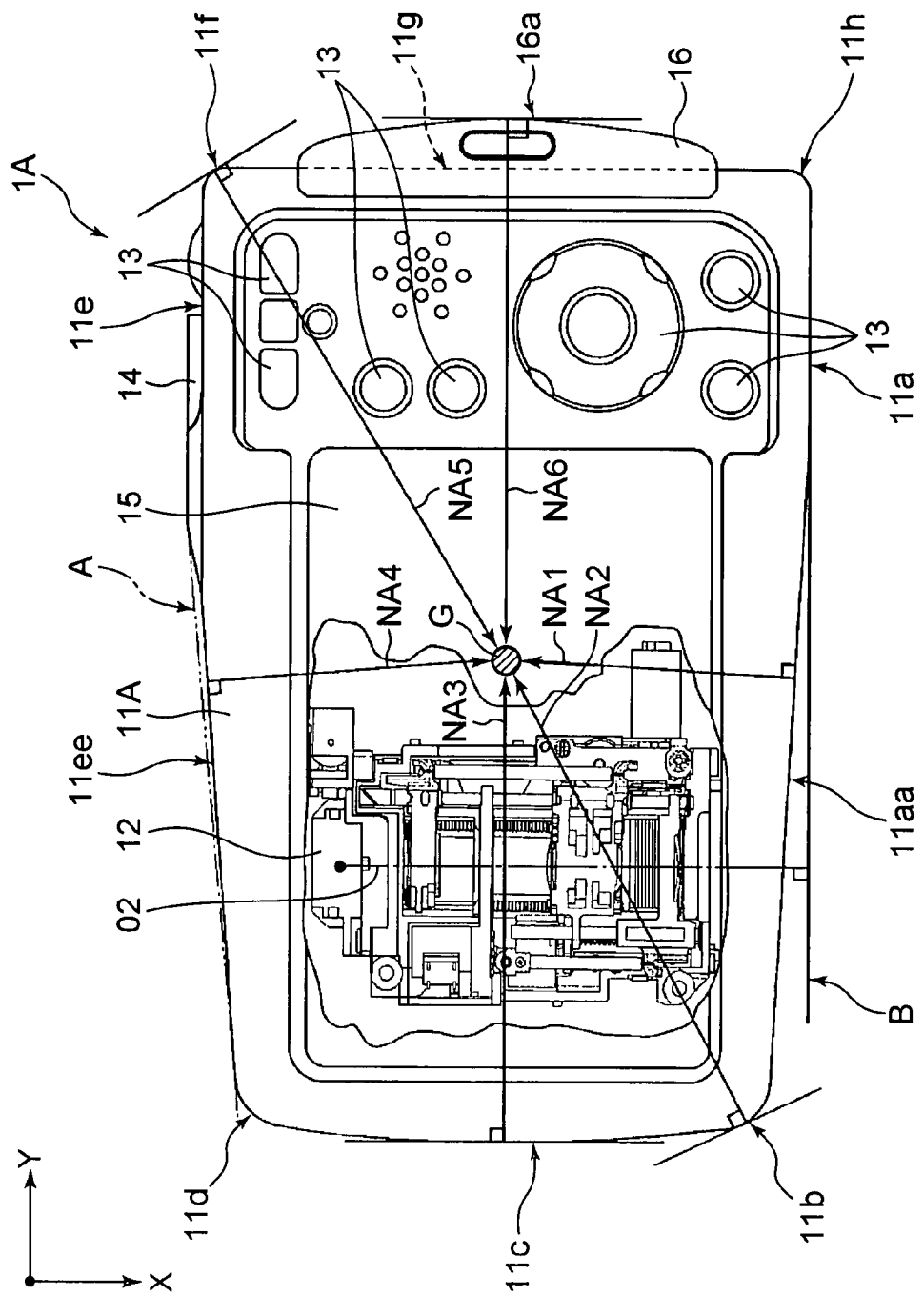
FIG. 7 is a rear view of a camera according to a second embodiment of the present invention.
Figure 8:
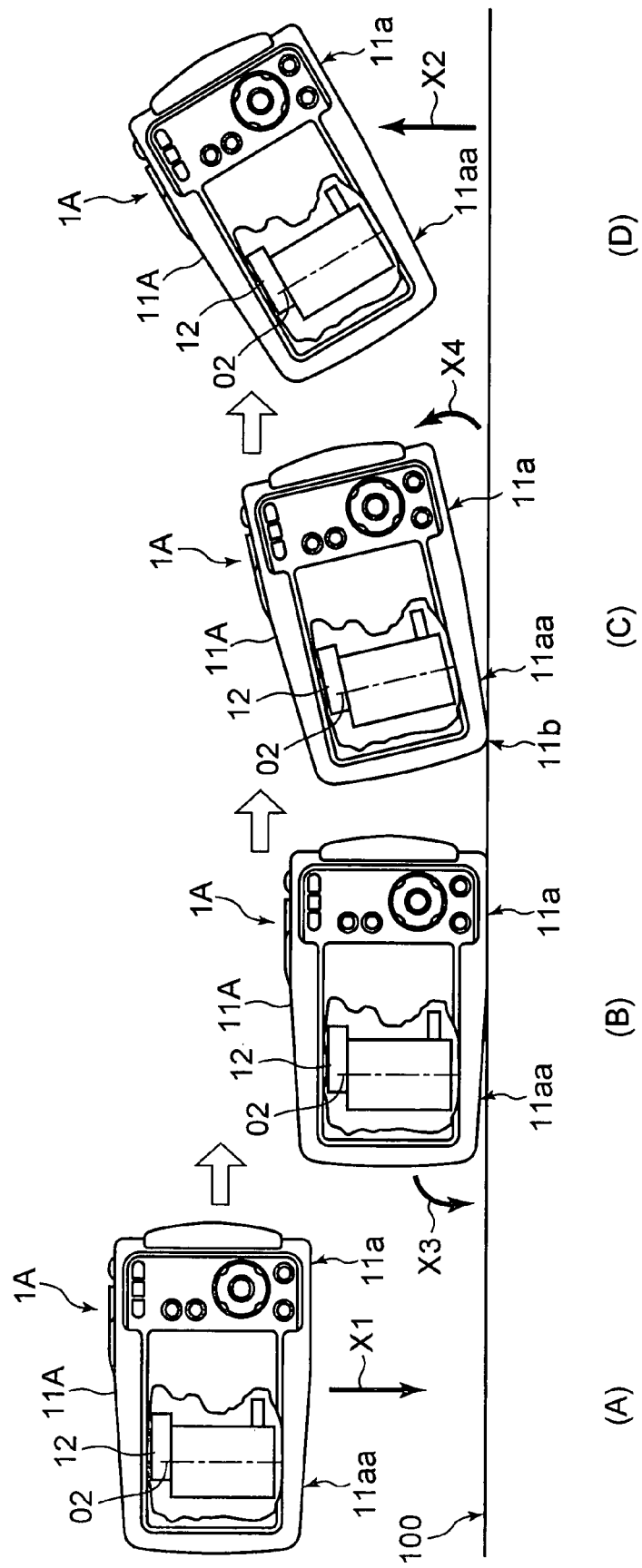

FIG. 7 is a rear view of a camera according to the second embodiment of the invention. FIG. 7, like FIG. 1, shows the layout of the lens barrel unit provided in the camera in a partly broken-away manner. FIG. 8 is a conceptual diagram chronologically illustrating the operation with the bottom face of the camera hitting a planar floor (or flat surface) or the like in a state where the optical axis of the lens barrel unit of the camera is approximately orthogonal to a camera-dropped surface when the camera falls on the floor or the like.

The configuration of a camera 1A of the second embodiment (see FIG. 7) is approximately identical to the configuration of the camera 1 of the first embodiment (see FIG. 1). The shape of an outer case member 11A slightly differs from that of the outer case member 11, and the layout of the lens barrel unit 12 in the outer case member 11A differs from that in the outer case member 11. Therefore, the detailed description of the configuration approximately identical to that of the first embodiment will be omitted, and a description will be given of only different components.

The outer case member 11A of the camera 1A of the second embodiment is similar to the outer case member 11 of the first embodiment in that the outer case member 11A is formed by a near hexahedron having a bottom face, a left side face 11c, a top face, a right side face 11g, a back face and a front face. The outer case member 11A of the second embodiment slightly differs from that of the first embodiment in the shapes of the bottom face and the top face of the outer case member 11A.

Specifically, the bottom face of the outer case member 11A is formed by a reference bottom face 11a positioned closer to the right side face 11g and approximately orthogonal to the left and right side faces 11c, 11g, and an inclined face 11aa contiguous from the reference bottom face 11a and having a predetermined angle to the reference bottom face 11a. As shown in FIG. 7, the inclined face 11aa is formed to have an upper leftward inclination from the reference bottom face 11a as viewed from the back face of the camera 1A and is contiguous to the left side face 11c via the corner portion 11b.

The top face of the outer case member 11A is formed by a reference top face 11e positioned closer to the right side face 11g and approximately orthogonal to the left and right side faces 11c, 11g, and an inclined face 11ee contiguous from the reference top face 11e and having a predetermined angle to the reference top face 11e. As shown in FIG. 7, the inclined face 11ee is formed to have a lower leftward inclination from the reference top face 11e as viewed from the back face of the camera 1A and is contiguous to the left side face 11c via the corner portion 11d.

The reference bottom face 11a and the reference top face 11e are formed to be approximately in parallel to each other. The inclined face 11aa and the inclined face 11ee are formed to be approximately symmetrical to each other in the up and down direction of the camera 1A. Accordingly, the outer case member 11A of the camera 1A is formed to have a so-called wedge-like shape as viewed from the back face. As the reference top face 11e is provided with an outward projection like the shutter button 14, a portion near the reference top face 11e of the outer case member 11A as seen as the camera 1A is not formed flat.

The center of gravity of the camera 1A is at the position indicated by a reference numeral "G" in FIG. 7. In this case, the outer case member 11A is formed to have a first outer case surface having normal lines passing through the center of gravity G and a second outer case surface (reference bottom face 11a) formed so that none of normal lines pass through the center of gravity G.

Specifically, a normal line NA1 of the inclined face 11aa of the bottom face of the outer case member 11A passes through the center of gravity G. A normal line NA2 of the corner portion 11b passes through the center of gravity G. A normal line NA3 of the left side face 11c passes through the center of gravity G. A normal line NA4 of a face A connecting one end of the inclined face 1ee of the top face of the outer case member 11A to the top face of the shutter button 14 passes through the center of gravity G. A normal line NA5 of the corner portion 11f passes through the center of gravity G. A normal line NA6 of an outer peripheral face 16a of the strap fitting 16 which protrudes from the right side face 11g passes through the center of gravity G. Each outer case surface having a normal line passing through the center of gravity G is called "first outer case surface". None of the normal lines of the reference bottom face 11a, which belongs to the second outer case surface, pass through the center of gravity G. The second outer case surface is an outer case surface other than the first outer case surface. That is, normal lines passing through the center of gravity G cannot be drawn within the range of the reference bottom face 11a. A perpendicular line drawn from the center of gravity G to the reference bottom face 11a intersects an imaginary plane which lies off the reference bottom face 11a but is the extension of the reference bottom face 11a.

The lens barrel unit 12 is disposed inside the thus formed outer case member 11A at a predetermined position in a predetermined mode. Because the configuration of the lens barrel unit 12 of the second embodiment is quite identical to that of the first embodiment, the components of the lens barrel unit 12 are given the same reference numerals as those used for the first embodiment.

That is, the lens barrel unit 12 is arranged inside the outer case member 11A in such a way that none of normal lines of the outer case member 11A which pass through the center of gravity G are in parallel to the moving direction of the movable lenses (second lens group 24a, third lens group 25a; see FIGS. 2 and 3) along the optical axis O2.

The lens barrel unit 12 is arranged in such a way that the optical axis O2 is approximately in parallel to a direction approximately orthogonal to the reference bottom face 11a (i.e., the normal line of the second outer case surface). In other words, the relationship between the reference bottom face 11a and the optical axis O2 is set so that in FIG. 7, the optical axis O2 is approximately orthogonal to an imaginary plane B which is the extension of the reference bottom face 11a.

When the thus configured camera 1A of the embodiment falls in the vertical direction (direction of an arrow X1 in FIG. 8(A)) in a state where with the bottom face of the outer case member 11A facing downward, the reference bottom face 11a and the camera-dropped surface 100 become approximately in parallel to each other as shown in FIG. 8(A), for example, first, the reference bottom face 11a contacts the camera-dropped surface 100 as shown in FIG. 8(B).

Next, the camera 1A rotates in a direction of an arrow X3 shown in FIG. 8(B) (counterclockwise direction in FIG. 8(B)) about the reference bottom face 11a which is the contact point, and changes its state in such a direction that the inclined face 11aa of the bottom face contacts the camera-dropped surface 100.

When the corner portion 11b of the camera 1A contacts the camera-dropped surface 100, the torque of the camera 1A in the direction of the arrow X3 causes the camera 1A to rotate in the direction of an arrow X4 shown in FIG. 8(C) (counterclockwise direction in FIG. 8(C)) about the corner portion 11b as shown in FIG. 8(C). Accordingly, the camera 1A changes to a state as shown in FIG. 8(C)).

Then, the camera 1A receives the bouncing force in the direction of an arrow X2 shown in FIG. 8(D) while receiving the torque in the direction of the arrow X4.

In a case where the camera 1A falls in the state as shown in FIG. 8, therefore, the fall-oriented impact force is converted to the torque to rotate the camera 1A and attenuated when the camera 1A hits the camera-dropped surface 100. This also reduces the impact force to be applied to the lens barrel unit 12.

According to the second embodiment of the invention, as described above, the outer case member 11A is formed to have the first outer case surface having normal lines passing through the center of gravity G and the second outer case surface formed so that none of normal lines pass through the center of gravity G. Further, the lens barrel unit 12 is arranged inside the camera 1A in such a way that none of normal lines (NAx) passing through the center of gravity G of the camera 1A are in parallel to the moving direction of the movable lenses of the lens barrel unit 12 of the lens barrel unit 12 (optical axis O2). This configuration reduces the load applied to the lens barrel unit 12 by the impact force caused when the camera 1A falls or hits something. Because no additional components are unnecessary, the impact resistance of the lens barrel unit 12 can be ensured without interfering the compactness of the camera 1A itself by merely properly designing the arrangement of the lens barrel unit 12 in the outer case member 11.

Next, the third embodiment of the invention will be described below.

Figure 9:
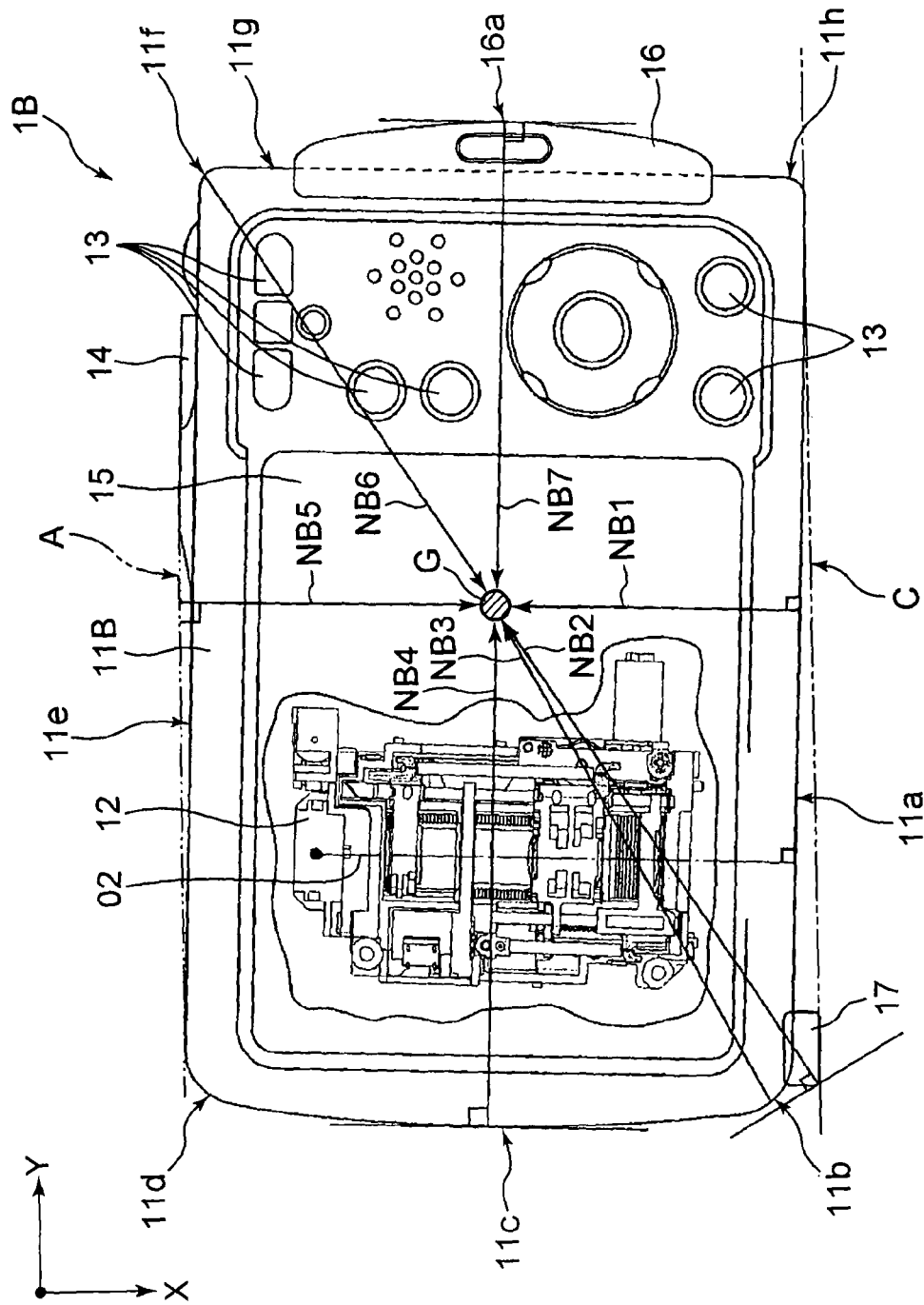
FIG. 9 is a rear view of a camera according to a third embodiment of the present invention.
Figure 10:
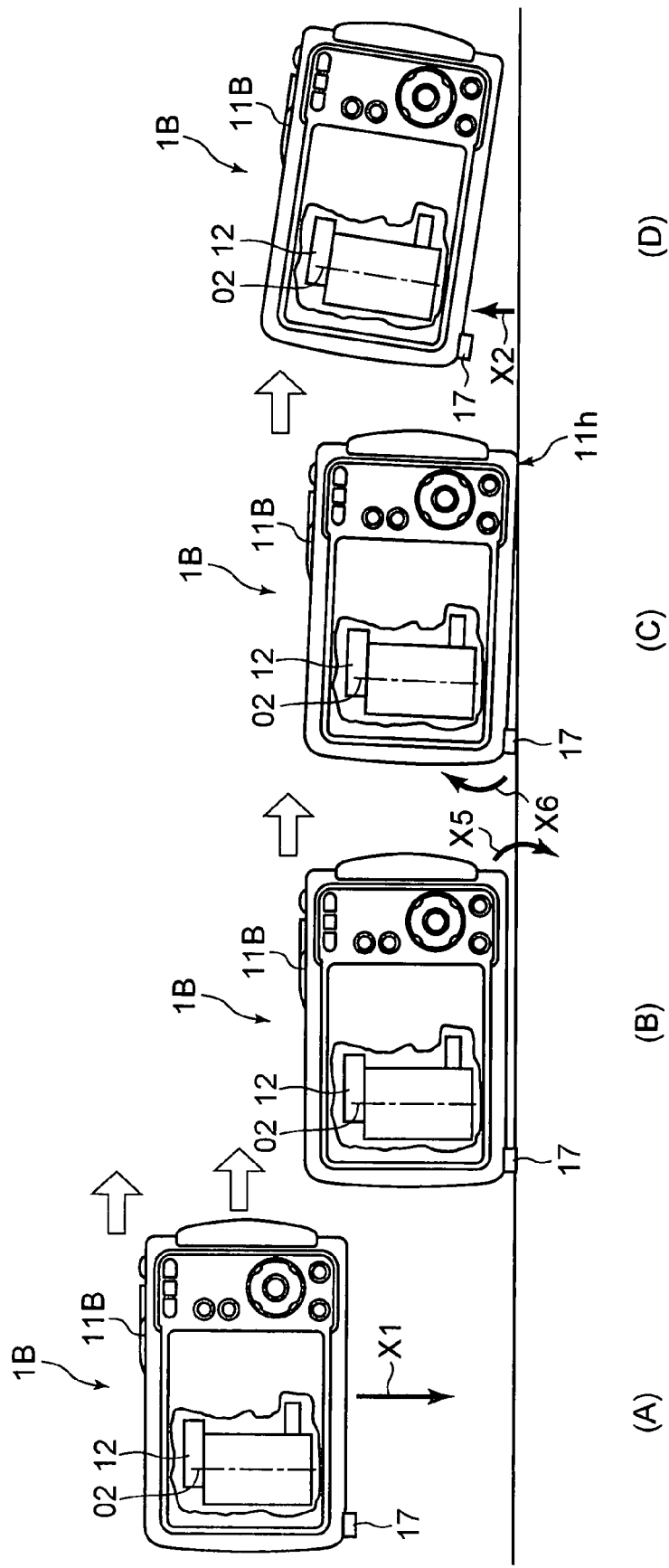

FIG. 9 is a rear view of a camera according to the third embodiment of the invention. FIG. 9, like FIG. 1, shows the layout of the lens barrel unit provided in the camera in a partly broken-away manner. FIG. 10 is a conceptual diagram chronologically illustrating the operation with the bottom face of the camera hitting a planar floor or the like in a state where the optical axis of the lens barrel unit of the camera is approximately orthogonal to a camera-dropped surface when the camera falls on the floor or the like.

The configuration of a camera 1B of the third embodiment (see FIG. 9) is approximately identical to the configuration of the camera 1 of the first embodiment (see FIG. 1). The third embodiment differs from the first embodiment only in that an outward projection 17 is formed on a predetermined outer case surface of the outer case member 11A at a predetermined position, and in the layout mode of the lens barrel unit 12 in the outer case member 11B. Therefore, the detailed description of the configuration approximately identical to that of the first embodiment will be omitted, and a description will be given of only different components.

The outer case member 11B of the camera 1B of the third embodiment is quite the same as the outer case member 11 of the first embodiment in that the outer case member 11B is formed by a near hexahedron having a bottom face 11a, a left side face 11c, a top face 11e, a right side face 11g, a back face and a front face. In addition, the outward projection 17 is provided on the bottom face 11a of the outer case member 11B in the vicinity of the corner portion 11b. As the projection 17, a part of the outer case member 11B may be formed in a protrusive shape, or a separate projection member from the outer case member 11B may be integrally provided at a predetermined position of the outer case member 11B by means of an adhesive or the like.

It is assumed that the center of gravity of the camera 1B be at a position indicated by a reference numeral "G" in FIG. 9. In this case, the outer case member 11B is formed to have faces having normal lines passing through the center of gravity G.

Specifically, a normal line NB1 of the bottom face 11a of the outer case member 11B passes through the center of gravity G. A normal line NB2 at a tangential line at the outer peripheral portion of the projection 17 passes through the center of gravity G. A normal line NB3 of the corner portion 11b passes through the center of gravity G. A normal line NB4 of the left side face 11c passes through the center of gravity G. A normal line NB5 of a face A connecting one end of the top face 11e of the outer case member 11B to the top face of the shutter button 14 passes through the center of gravity G. A normal line NB6 of the corner portion 11f passes through the center of gravity G. A normal line NB7 of an outer peripheral face 16a of the strap fitting 16 which protrudes from the right side face 11g passes through the center of gravity G.

A face C (indicated by a two-dot chain line in FIG. 9) connecting one end of the bottom face 11a of the outer case member 11B to the outer surface of the projection 17 is an imaginary plane which contacts a predetermined plane (flat surface) when the camera 1B is placed so that its bottom face contacts the predetermined plane. The portions of the camera 1B which actually contact the plane are two portions, namely, one end of the bottom face 11a (near the corner portion 11h) and the bottom face of the projection 17.

The outer case member 11B of the embodiment is formed to include the bottom face 11a that has the normal line NB1 passing through the center of gravity G of the camera 1B. At the same time, the projection 17 is formed at a position off the extension of the normal line NB1 passing through the center of gravity G, i.e., in the vicinity of the corner portion 11b. It is desirable that the projection 17 be arranged at a position which maximizes (makes longer) the distance from the extension of the normal line NB1 passing through the center of gravity G.

The lens barrel unit 12 is disposed inside the thus formed outer case member 11B at a predetermined position in a predetermined manner. Because the configuration of the lens barrel unit 12 of the third embodiment is quite identical to that of the first embodiment, the components of the lens barrel unit 12 are given the same reference numerals as those used for the first embodiment.

That is, the lens barrel unit 12 is configured to have movable lenses (second lens group 24a, third lens group 25a; see FIGS. 2 and 3) which move in a direction in parallel to the normal line NB1 of the outer case member 11B that passes through the center of gravity G.

In other words, the lens barrel unit 12 is arranged in such a way that the optical axis O2 is approximately orthogonal to the bottom face 11a, i.e., approximately in parallel to the normal line NB1 of the bottom face 11a.

When the thus configured camera 1B of the embodiment falls in the vertical direction (direction of an arrow X1 in FIG. 10(A)) in a state where with the bottom face of the outer case member 11B facing downward, the bottom face 11a and the camera-dropped surface 100 become approximately in parallel to each other as shown in FIG. 10(A), for example, first, the bottom face of the projection 17 contacts the camera-dropped surface 100 as shown in FIG. 10(B).

Next, the camera 1B rotates in a direction of an arrow X5 shown in FIG. 10(B) (clockwise direction in FIG. 10(B)) about the projection 17, and changes its state. Then, the corner portion 11h contacts the camera-dropped surface 100 as shown in FIG. 10(C).

When the corner portion 11h of the camera 1B contacts the camera-dropped surface 100, the torque of the camera 1B in the direction of the arrow X5 becomes repulsive force to cause the camera 1B to rotate in the direction of an arrow X6 shown in FIG. 10(C) (counterclockwise direction in FIG. 10(C)) about the corner portion 11h as shown in FIG. 10(C). Accordingly, the camera 1B changes to a state as shown in FIG. 10(C).

Then, the camera 1B receives the bouncing force in the direction of an arrow X2 shown in FIG. 10(D) while receiving the torque in the direction of the arrow X6.

In a case where the camera 1B falls in the state as shown in FIG. 10, therefore, the fall-oriented impact force is converted to the torque to rotate the camera 1B and attenuated when the camera 1B hits the camera-dropped surface 100. This also reduces the impact force to be applied to the lens barrel unit 12.

According to the third embodiment of the invention, as described above, the projection 17 protruding outward is provided at the outer case member 11B having normal lines passing through the center of gravity G of the camera, on the bottom face 11a having normal lines passing through the center of gravity G and at a position lying off the extension of the normal lines passing through the center of gravity G. Further, the lens barrel unit 12 is arranged inside the camera 1B in such a way that the optical axis O2 of the lens barrel unit 12 or the moving direction of the movable lenses becomes in parallel to the normal line NB1 passing through the center of gravity G of the camera. This reduces the load applied to the lens barrel unit 12 when the camera 1B falls or hits something. Because no additional components are unnecessary, the impact resistance of the lens barrel unit 12 can be ensured without interfering the compactness of the camera 1A itself by merely properly designing the arrangement of the lens barrel unit 12 in the outer case member 11B.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera comprising:
    an outer case member having one face or a plurality of faces having normal lines passing through a center of gravity of the camera; and
    a lens unit disposed inside the outer case member and having a lens movable in a direction along an optical axis of the lens unit to which none of the normal lines passing through the center of gravity are in parallel such that a force applied to any point on the outer case is reduced in the direction of movement of the lens unit.

2. The camera according to claim 1, wherein the movable lens is supported and moved by a shaft member.

3. The camera according to claim 1, wherein the outer case member is made of a copper alloy or polycarbonate resin.

4. The camera according to claim 1, wherein the outer case member includes a curved face element and a flat face element.

5. The camera according to claim 1, wherein the outer case member includes an outer case face formed in such a way that a normal line thereof does not pass through the center of gravity of the camera.

6. The camera according to claim 1, wherein the lens unit has a lens frame which moves holding the lens, a moving direction of the lens frame being not in parallel to the normal lines passing through the center of gravity of the camera.

7. The camera according to claim 6, wherein the lens frame moves while being supported and guided by a shaft member, and the lens frame being formed in a shape cantilevered from the shaft member.

8. The camera according to claim 1, further comprising: an outer case face formed in such a way that a normal line thereof does not pass through the center of gravity; and a lens that is movable in parallel to the normal line.

9. A camera comprising:
    an outer case member having a plurality of face elements including a face element whose normal line passes through a center of gravity of the camera, and a face element whose normal line does not pass through the center of gravity; and
    a lens unit disposed inside the outer case member and having a lens movable in a direction along an optical axis of the lens unit to which none of the normal lines passing through the center of gravity of the camera are in parallel such that a force applied to any point on the outer case is reduced in the direction of movement of the lens unit.

10. The camera according to claim 9, wherein the movable lens is supported and moved by a shaft member.

11. The camera according to claim 9, wherein the outer case member is made of a copper alloy or polycarbonate.

12. The camera according to claim 9, wherein the outer case member includes curved and flat face elements.

* * * * *